United States Patent [19]

Kadlec et al.

[11] Patent Number: 4,698,681
[45] Date of Patent: Oct. 6, 1987

[54] DUAL INTENSITY VIDEO CIRCUIT

[75] Inventors: Joseph Kadlec, Berwyn; Kenneth W. Kociolek, Chicago, both of Ill.

[73] Assignee: Zenith Electronics Corporation, Glenview, Ill.

[21] Appl. No.: 774,671

[22] Filed: Sep. 11, 1985

[51] Int. Cl.$^4$ ............................................. H04N 5/235
[52] U.S. Cl. .................................. 358/168; 358/174; 340/793
[58] Field of Search ............... 358/166, 168, 169, 188, 358/174, 22; 340/789, 791, 793, 794, 790

[56] References Cited

U.S. PATENT DOCUMENTS

| | | | |
|---|---|---|---|
| 3,389,222 | 6/1968 | Schoen | 358/174 |
| 4,013,833 | 3/1977 | Zimmerman | 358/168 |
| 4,091,419 | 5/1978 | Rhee | 358/168 |
| 4,270,126 | 5/1981 | Bafaro | 358/168 |
| 4,355,334 | 10/1982 | Fitzgibbon | 358/168 |
| 4,598,316 | 7/1986 | Rogers | 358/168 |

Primary Examiner—Tommy P. Chin

[57] ABSTRACT

A dual intensity video highlight circuit for enabling a maximum brightness display on a CRT includes a cascode connection of a video output transistor and a video driver transistor with the video driver transistor having a pair of series connected resistors in its emitter circuit. A character generator supplies pulse signals of different amplitudes to the video driver transistor, which inverts the signals. The inverted signals are amplified by the video output transistor and supplied to drive the CRT. A video intensifier transistor has its emitter collector junction connected across one of the emitter resistors for shorting out that resistor, responsive to a control signal, for changing the gain of the video output transistor to permit a maximum brightness display for highlighting.

2 Claims, 2 Drawing Figures

DUAL INTENSITY VIDEO CIRCUIT

BACKGROUND OF THE INVENTION

This invention relates generally to video circuits for use in video display terminals and particularly to such circuits that enable selective control of the brightness of one or more areas of the display.

Video display systems are well known in the art. They generally comprise a cathode ray tube (CRT) driven by a character generator under the control of a microprocessor control means for selecting the signals to be produced by the character generator for display. The character generator output consists of a series of pulses that are supplied to a video amplifier. The video amplifier processes the information and supplies it to the CRT for creating a video display, all in a well known manner. The video display terminal usually has a user operated keyboard coupled to the microprocessor control means and may include the facility for accepting a computer input for performing specialized tasks such as wordprocessing.

Many video display terminals also include means for displaying one or more pixels or sections of data in different levels of contrast. Some also have the capability of displaying sections in a much greater brightness of highlighting. The highlighting may be under direct control of the user through the keyboard or may be software-based for automatically displaying certain portions of the image in very high brightness. In prior art systems including both these features, namely different contrast levels (gray scale) and selective high brightness control for portions of the display, the gray scale feature is generally overridden or lost in the portion of the display that is highlighted. This is not generally desirable. With the present invention, a simple circuit arrangement is provided for retaining the multilevel gray scale feature even in highlighted areas.

OBJECTS OF THE INVENTION

A principal object of the invention is to provide a novel video display system.

Another object of the invention is to provide an improved video amplifier means for a video display system.

A further object of the invention is to provide a high intensity video display system that solves the problems of the prior art.

BRIEF DESCRIPTION OF THE DRAWINGS

Other objects and advantages of the invention will be apparent upon reading the following description in conjunction with the drawings in which.

DESCRIPTION OF THE PREFERRED EMBODIMENT

Figure 2:
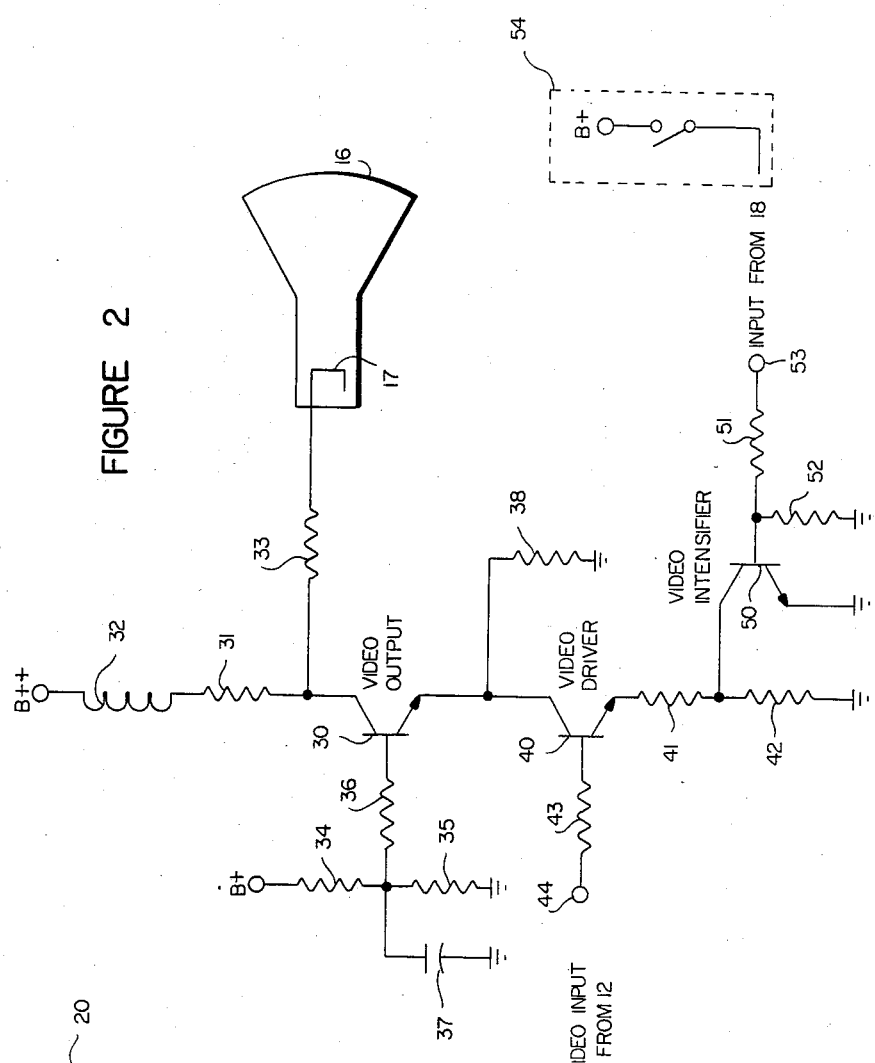
FIG. 2 is a schematic diagram of a portion of the block diagram of FIG. 1.
Figure 1:
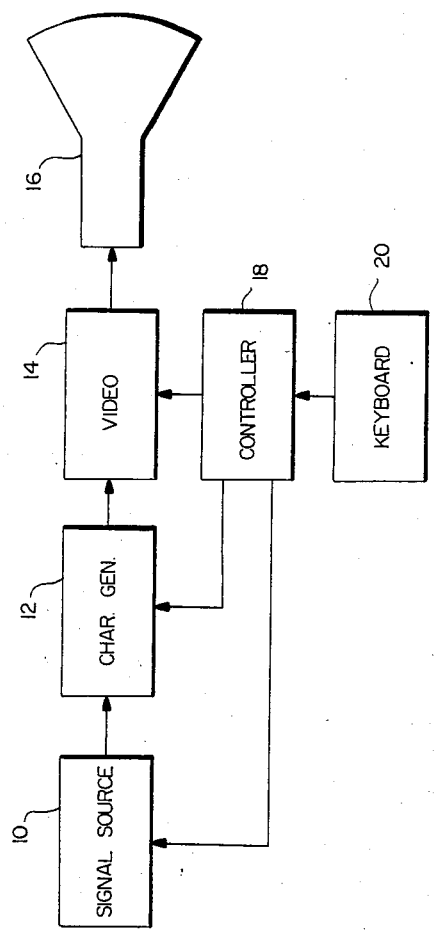
FIG. 1 is a block diagram of a video display terminal constructed in accordance with the invention.

Referring to FIG. 1, a signal source 10 is coupled to a character generator 12 that in turn supplies a video circuit 14 having an output coupled to a cathode ray tube 16. A microprocessor based controller 18 has control lines coupled to signal source 10, to character generator 12 and to video circuit 14 for controlling the operation of these units. A keyboard 20 is coupled to controller 18. The various apparatuses in the labelled blocks are all well known in the art with microprocessor based controller 18 coordinating and controlling operations of signal source 10, character generator 12 and keyboard 20. Character generator 12 supplies output signal pulses of varying heights, in accordance with the multilevel contrast of the character or other pixel to be displayed. Video circuit 14 amplifies the signal pulses supplied by the character generator and in turn drives CRT 16. Responsive to control signals from controller 18, video circuit 14 functions to highlight selected ones of these signals by changing the maximum brightness level of the display to be significantly brighter than when in the normal mode. The circuit therefor is illustrated in FIG. 2.

A video output transistor 30 is stacked in a cascode circuit configuration with a video driver transistor 40. The collector of video output transistor 30 is connected in series with a load resistor 31 and a peaking coil 32 to a source of B++ voltage. Peaking coil 32 is included to increase the gain of the amplifier at higher frequencies. The emitter of video output transistor 30 is connected to the collector of video driver transistor 40 and to ground through a bias resistor 38. The base of output transistor 30 is connected through a resistor 36 to the junction of a voltage divider consisting of a series connection of a pair of resistors 34 and 35 connected between a source of B+ and ground. The junction of resistors 34 and 35 is connected to ground through a filter capacitor 37. Video output transistor 30 is a high gain amplifier and its collector output is connected through a resistor 33 to the cathode 17 of CRT 16. Video driver transistor 40 has its base connected through a resistor 43 to a video input terminal 44. Terminal 44 is supplied with the output pulse signals from character generator 12. The emitter of driver transistor 40 is connected, in series with a pair of resistors 41 and 42, to ground. Video driver transistor 40 functions as an inverter with unity gain. Responsive to the input pulse signals from character generator 12 appearing at its base, video driver 40 inverts the pulse signals and applies them to the emitter of video output transistor 30. The overall gain of the cascode video stage is thus seen to be a direct function of the ratio of load resistor 31 to the sum of emitter resistors 41 and 42.

A video intensifier circuit, for effecting the highlighting function, consists of a transistor 50 having its collector connected to the junction of emitter resistors 41 and 42 and its emitter connected to ground. The base of video intensifier transistor 50 is connected to the junction of a resistor 52 connected to ground and a resistor 51 connected to terminal 53. Terminal 53 is supplied with control signals from controller 18 for intensifying or increasing, by approximately 50%, the display brightness of the selected pixel or section of video. As indicated by dashed line block 54, including a switch connected to B+, the highlighting control signal from controller 18 consists of a positive potential.

Under normal operation, that is with no B+ supplied to terminal 53, video intensifier transistor 50 is not conductive and the video input pulse signals at terminal 44 are inverted by video driver transistor 40 and amplified by video output transistor 30 to drive the cathode of CRT 16 in accordance with the level of the input pulse signal. Thus the level (gray scale) of the input pulse signals at the base of video driver 40 is amplified and applied as output signals to CRT 16. Hence any gray scale variations are passed on to the CRT. In response to a highlight control signal from controller 18 (a positive potential at terminal 53), video intensifier transistor 59 is driven into heavy conduction and presents a very low impedance across resistor 42. Thus, electrically speaking, emitter resistor 42 is removed from the circuit and the ratio of the resistance of load resistor 31 and the emitter resistance (now only resistor 41) in the video stage is changed significantly to produce the highlight drive condition for CRT 16. Thus, any full brightness input pulse signal from character generator 16 will be reproduced at a very high brightness level by CRT 16. It will be noted however that, despite the highlight brightness condition, contrast variations in the input pulse signals are retained. Thus the video display is selectively intensified, or highlighted, without sacrificing gray scale variations of the input pulse signals.

What has been described is a novel intensifier circuit for a video display terminal. It is recognized that numerous changes in the described embodiment of the invention will be apparent to those skilled in the art without departing from its true spirit and scope. The invention is to be limited only as defined in the claims.

What is claimed is:

1. A highlight circuit for a video display system including a CRT comprising:

a video output transistor having a load resistor for supplying video signals to said CRT;

a video driver transistor coupled in a cascode connection with said video output transistor and having a pair of series connected emitter resistors, said video driver transistor adapted for receiving and inverting an input video signal of varying amplitude;

an intensifier transistor having a base-emitter input circuit adapted to be driven into heavy conduction by a highlight signal and a collector-emitter output circuit connected across one of said emitter resistors; and means for supplying said highlight signal for driving said intensifier transistor conductive to short out said one emitter resistor and change the gain of said video output transistor whereby said video output transistor supplies video signals of greater magnitude to said CRT without substantially affecting its ability to track said varying amplitude input signal.

2. The circuit of claim 1, further including:

character generator means for generating said input video signal coupled to said video driver transistor; and controller means for selectively controlling the supplying of said highlight signal to said intensifier transistor.

* * * * *